United States Patent
Morris et al.

(10) Patent No.: US 9,281,128 B2
(45) Date of Patent: Mar. 8, 2016

(54) SWITCHABLE CAPACITOR

(75) Inventors: Francis J. Morris, Dallas, TX (US);
Cody B. Moody, Frisco, TX (US);
Andrew Malczewski, Richardson, TX (US)

(73) Assignee: Raytheon Company, Waltham, MA (US)

(*) Notice: Subject to any disclaimer, the term of this patent is extended or adjusted under 35 U.S.C. 154(b) by 769 days.

(21) Appl. No.: 13/556,273

(22) Filed: Jul. 24, 2012

(65) Prior Publication Data
US 2014/0028113 A1    Jan. 30, 2014

(51) Int. Cl.
*H02M 3/06* (2006.01)
*H01G 5/18* (2006.01)
*H01H 59/00* (2006.01)

(52) U.S. Cl.
CPC ............ *H01G 5/18* (2013.01); *H01H 59/0009* (2013.01)

(58) Field of Classification Search
USPC .......................................................... 307/109
See application file for complete search history.

(56) References Cited

U.S. PATENT DOCUMENTS

| | | | | |
|---|---|---|---|---|
| 7,102,472 B1 * | 9/2006 | Nathanson | ......... | H01H 59/0009 200/181 |
| 8,779,534 B2 * | 7/2014 | Kwa | ...................... | H01H 35/14 257/415 |
| 2011/0259717 A1 | 10/2011 | Pillans et al. | | |

FOREIGN PATENT DOCUMENTS

| WO | WO 02/01584 A1 | 6/2001 |
|---|---|---|
| WO | WO 2006/007042 A2 | 1/2006 |
| WO | WO 2006/007042 A3 | 1/2006 |

OTHER PUBLICATIONS

Int'l Preliminary Report on Patentability dated Jan. 27, 2015 for Int'l PCT Application No. PCT/US2012/067002, 12 pages.
Notification of Transmittal of the International Search Report and the Written Opinion of the International Searching Authority, or the Declaration, PCT/US2012/067002, Aug. 6, 2013, 1 page.
International Search Report, PCT/US2012/067002, Aug. 16, 2013, 5 pages.
Written Opinion of the International Searching Authority, PCT/US2013/020612, Aug. 6, 2013, 10 pages.
Invitation to pay Additional Fees and, where applicable, protest fee, PCT/US2012/067002, Apr. 22, 2013, pp. 1-8.

* cited by examiner

*Primary Examiner* — Rexford Barnie
*Assistant Examiner* — Xuan Ly
(74) *Attorney, Agent, or Firm* — Daly, Crowley, Mofford & Durkee, LLP

(57) ABSTRACT

A switchable capacitor having: a dielectric; a pair of electrodes, a first one of the electrodes having the dielectric thereon and a second, flexible one of the electrodes being suspended over the dielectric when the switchable capacitor is in an de-activated state; and top plate disposed between the dielectric and the second, flexible electrode and connected to a reference potential. When the switchable capacitor is electrostatically driven to an activated state, the second one of the electrodes contacts the top plate and when the switchable capacitor is returned to the de-activated state, charge on the top plate is discharged to the reference potential.

20 Claims, 8 Drawing Sheets

SWITCHABLE CAPACITOR

TECHNICAL FIELD

This disclosure relates generally to switchable capacitors and more particularly to switchable capacitors used to selectively couple or decouple a microwave signal between an input section and an output section of a microwave transmission line.

BACKGROUND AND SUMMARY

As is known in the art, it is sometimes desirable to provide a switch between an input section and an output section of a microwave transmission line. One device for performing this function is a radio frequency (RF) micro-electro-mechanical system (MEMS) switch. This existing type of switch typically has a substrate with two conductive posts spaced apart on the substrate. The switch includes a switchable capacitor having a conductive part (e.g., a bottom electrode of the switchable capacitor) on the substrate disposed between, but electrically separated from, the bottom portions of the posts. The bottom electrode is covered by a layer of a solid dielectric material. A flexible, electrically conductive membrane (e.g., the upper electrode of the switchable capacitor) extends between, and has ends thereof electrically connected to, the tops of the posts, so that a central portion of the flexible, electrically conductive membrane is suspended above the bottom electrode. An input section of a microwave transmission line is coupled to one of the first and second electrodes and an output second on the transmission line is coupled to the other one of the transmission line.

An RF signal is typically applied to the input section and is capacitively coupled through the switch to the output section. More particularly, the switch includes a switchable voltage source coupled between the top and bottom electrode for producing a switchable electrostatic force between the first electrode and to second electrodes (i.e., between the bottom and top electrodes). The switchable electrostatic force changes the spacing between the first and second electrodes, and hence switches the capacitance of the switch, selectively in accordance with a voltage produced by the switchable bias voltage source.

More particularly, in the absence of a voltage produced by the switchable voltage source, (i.e., in a de-actuated or non-actuated state), the second, flexible electrode is spaced above both the first electrode and the solid dielectric layer in the low capacitance state. In order to actuate the switch, a switchable voltage source is connected between the first and second electrodes. This bias voltage produces electrostatic charges on the first and second electrode and the charges cause the first and second electrodes be electrostatically attracted to each other. This attraction causes the central portion of the second, flexible electrode to move downwards towards the first electrode and touches the top of the solid dielectric layer; this is the actuated position or high capacitive state of the switch.

In this actuated state of the switch, the spacing between the first and second electrodes is less than in the de-actuated state. Therefore, in the actuated state, the capacitive coupling between the first and second electrodes is significantly larger than in the de-actuated state. Consequently, in the actuated state, the RF signal traveling through one of the first and second electrodes is capacitively coupled substantially in its entirety to signals traveling along the other one of the first and second electrodes.

In order to de-actuate the switch, the DC bias voltage is turned off. The inherent resilience of the second, flexible electrode then returns to its original position, which represents the de-actuated state of the switch. Because the capacitive coupling between the first and second electrodes is much lower in the de-actuated state, the RF signal traveling through one of the first and second electrodes experiences little or no capacitive coupling to signals traveling along the other one of the first and second electrodes.

The inventors have recognized that in certain applications, it is desirable to have a high pull down voltage on the second, flexible electrode for high power applications since if the pull down voltage is too low; the RF, microwave signal can itself activate the switch; an undesirable effect. If the pull down voltage on conventional RF MEMS switch is increased, this will increase the electric field strength in the solid dielectric when the MEMS switch is closed (i.e., in the activated state). This can result in solid dielectric breakdown or excessive charging of the solid dielectric which can lead to "stiction" of the second, flexible electrode which can cause the flexible membrane to remain in the down or closed position even after the DC bias voltage is turned off and the switch is to return to the deactivated state.

In accordance with the present disclosure, a switchable capacitor is provided having: a solid dielectric; a pair of electrodes, a first one of the electrodes having the solid dielectric thereon and a second, flexible one of the electrodes suspended over the solid dielectric when the switchable capacitor is in an de-activated state; and a top plate disposed between the solid dielectric and the second, flexible electrode and connected to a reference potential. The top plate is coupled to a reference potential. When the switchable capacitor is electrostatically driven to an activated state, the second, flexible one of the electrodes contacts the top plate, and when the switchable capacitor is returned to the de-activated state, charge on the top plate is discharged to the reference potential.

In one embodiment, a switch is provided having: a solid dielectric; a pair of electrodes, a first one of the electrodes having the solid dielectric thereon and a second, flexible one of the electrodes being suspended over the solid dielectric when the switchable capacitor is in a de-activate state; and an aperture top metal or resistive plate disposed between the solid dielectric and the second, flexible electrode and connected to a reference potential. The top metal or resistive plate is fabricated with multiple holes through which the solid dielectric is exposed. The structure includes a switchable voltage source coupled between the first electrode and the second electrode for producing a switchable electrostatic force between the first electrode and the second electrode to electrostatically drive the capacitor between an activated state and the de-activated state. When the switchable capacitor is electrostatically driven to the activated state, the second one of the electrodes contacts the top plate. When this occurs, the top plate and second electrode are equipotential and thus no electrostatic force exists between them. Electrostatic force remains between the top plate and the bottom electrode through the apertures in the top plate. The force applied to the top electrode is a function of the applied voltage and the combined area of the apertures. The advantage here is charges trapped below the top plate are shielded by the top plate and will have no impact on the activation voltage of the flexible second electrode. If while activated, the solid dielectric traps a charge where the top plate is aperture this charge will be minimal and not sufficient to hold down the second electrode. Upon release of the second electrode any charge remaining in the solid dielectric under the top plate will terminate at the top plate and thus the second electrode will only see the potential of the top plate and not the charge within the solid dielectric. A discharge path is provided between non-apertured portion of the top plate and a reference potential to remove charge on the top plate when the switchable capacitor is returned to the de-activated state.

In one embodiment, a switching system is provided having: a substrate; a microwave transmission line having an input section and an output section; and a switchable capacitor disposed on the substrate. The capacitor includes: a solid dielectric; a pair of electrodes, a first one of the electrodes having the solid dielectric thereon and a second, flexible one of the electrodes being suspended over the solid dielectric when the switchable capacitor is in an de-activated state and wherein the second, flexible one of the electrodes is electrostatically driven toward the first electrode when the capacitor is switched to an activated state; and a top plate disposed between the solid dielectric and the second, flexible electrode and connected to a reference potential. A switchable voltage source is coupled between the first electrode and the second electrode for producing a switchable electrostatic force between the first electrode and the second electrode to electrostatically drive the capacitor between the activated state and the de-activated state. The voltage source switches between an activation voltage and a lower de-activation voltage. When the switchable capacitor is electrostatically driven to the activated state: microwave energy on the input section is coupled to the output section through the switchable capacitor; and the second one of the electrodes contacts the top plate and charge on the second one of the electrodes is discharged to a voltage less than the activation voltage of the switchable voltage source, thereby limiting the voltage across the solid dielectric layer.

In one embodiment, the top plate is resistive and a circuit is provided to heat the resistive top plate.

In one embodiment the circuit includes the resistive top plate.

The details of one or more embodiments of the disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
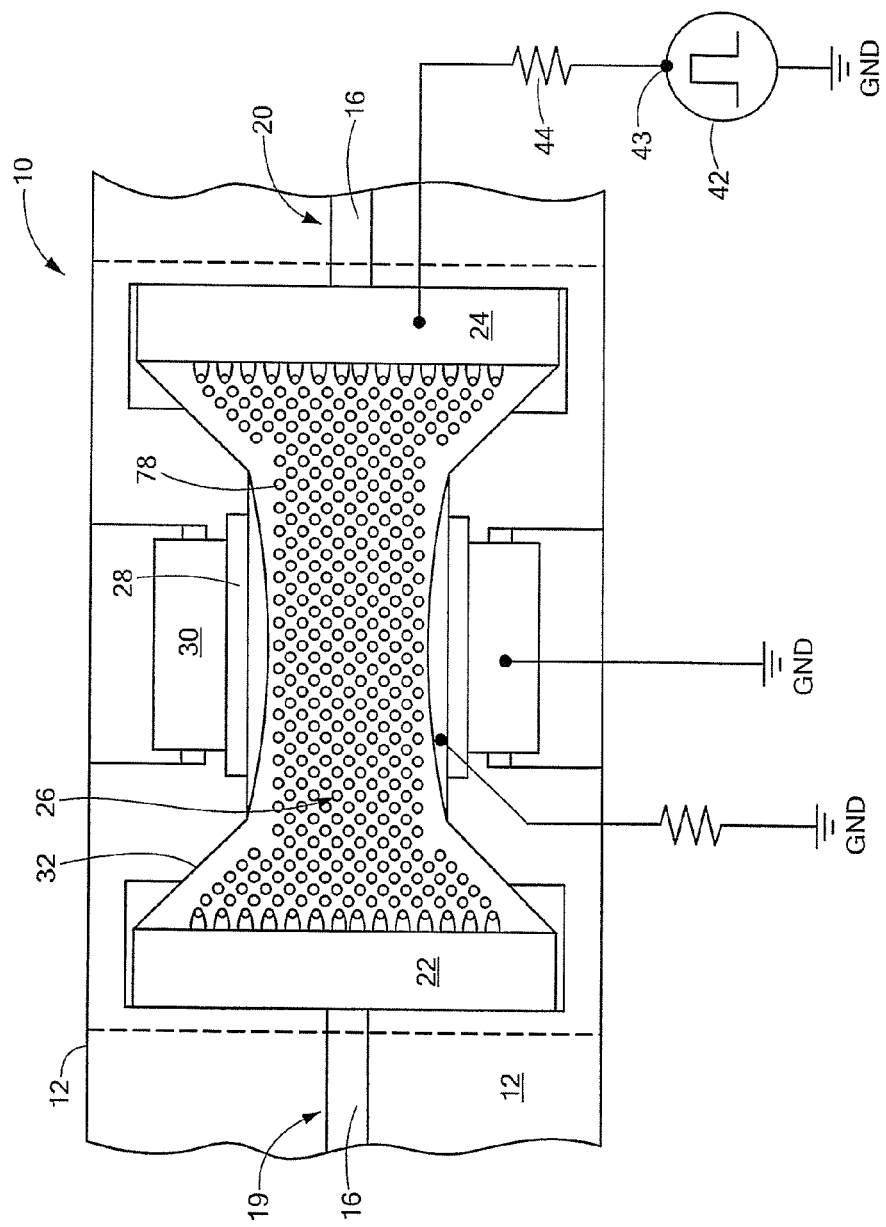
FIG. 1 is a top view of a switching system according to the disclosure.
Figures 2A, 2B:
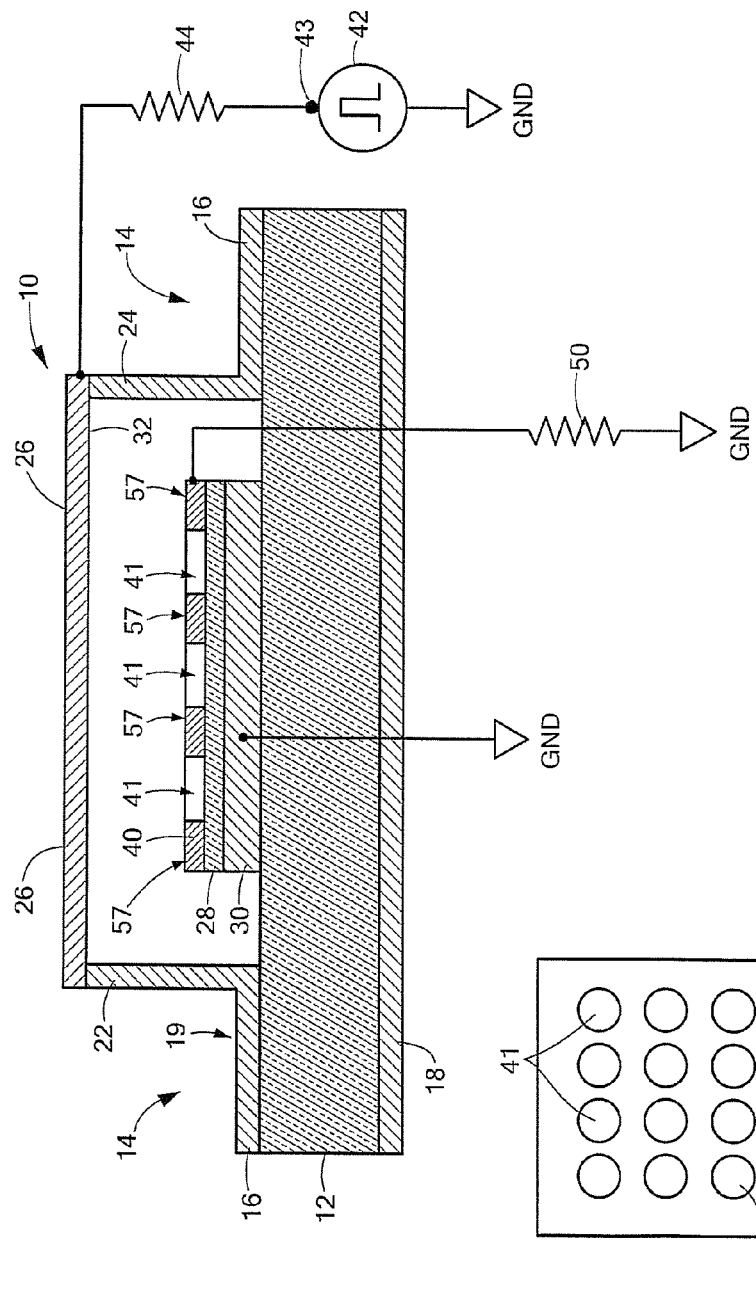
FIG. 2A is a cross-sectional diagrammatical sketch of the switching system of FIG. 1, according to the disclosure.
FIG. 2B is top view of a top plate used in a switch of the switching system of FIG. 1.

Referring now to FIGS. 1 and 2A, a switching system 10 is shown having: an insulating substrate 12; a microwave transmission line 14, here for example, a microwave transmission line having strip conductor circuitry 16 on one surface here the upper surface, of the substrate 12 and a ground plane conductor 18 on the opposite surface (i.e., the back surface) of the substrate 12. It should be understood that other type of microwave transmission lines may be used such as for example, coplanar waveguide (CPW) where the ground plane conductor 18 would be on the same surface as the strip conductor circuitry 16. In either case, the strip conductor circuitry 16 of an input section 19 of the transmission line 14 of the microwave transmission line 14 is connected to one of a pair of conductive, vertically extending posts 22 and the strip conductor circuitry 16 of an output section 20 of the microwave transmission line 14 is connected to the other one of the pair of conductive, vertically extending posts 24.

The switching system 10 includes a switchable capacitor 26 disposed on the substrate 12. The capacitor 26 includes: a sold dielectric 28, here for example, silicon nitride; a pair of electrodes 30, 32, a first one of the electrodes 30 is grounded to ground plane 18 and has the dielectric 28 thereon and a second, flexible one of the electrodes 32 being suspended by air over the dielectric 28 by the conductive posts 22, 24, when the switching system 10 (i.e., the switching capacitor 26) is in an de-activated state, as shown in FIGS. 2A and 2B, and wherein the second, flexible one of the electrodes 32 is electrostatically driven downwards toward the first electrode 30 when the switching system 10(i.e., the switching capacitor 26) is switched to an activated state, as shown in FIG. 2D.

A top plate 40 (FIG. 2B) is disposed on the dielectric 28 (FIG. 2A) between the dielectric 28 and the second, flexible electrode 32. The top plate 40 is connected to a reference potential, here ground, through a resistor 50 (FIGS. 1 and 2A. The top plate 40 may be a conductive material, such as gold, or may be a resistive material such as tin oxide, as will be described below, having an array of apertures 41 formed therein, as shown in FIG. 2B. The use of the top plate 40 increases the capacitance in the switch because, absent the top plate, the flexible electrode 32 may not make intimate contact across the entire area over the dielectric 28. More particularly, for some parts of the flexible electrode 32, small air gaps can exist between the flexible electrode 32 and the dielectric 28 which results in a decrease in the maximum capacitance in the actuated position. A side benefit of this RF MEMS circuit 10 is an expected increase in the MEMS capacitance when the switch is closed due to the intimate contact between top plate 40 and the dielectric 28.

The flexible electrode 32 is here, for example, aluminum on the order of 0.1 to 1 um thick, the top plate 40 is here, for example, aluminum or TiW having a thickness 0.01 to 1 um, the dielectric 28 is here, for example, 0.1 to 0.5 um thick silicon nitride and the bottom electrode 30 is here, for example, 0.1 to 1 um thick. Contact area 57 of top plate 40 with the flexible electrode 32 when in the activated state shown in FIG. 2D, could range from 10×10 to >500×500. Typically it is about 100×100. The apertures 41 may be rectangular or square or circular. The separation between the posts 22, 24 on the two ends supporting the flexible electrode 32 may be, for example, anywhere between about 50 and 500 um wide or larger; typically about 300 um. The apertures 41 in the top plate 40 are anywhere from 1-25 um in diameter and spaced 5-25 um apart.

A bias voltage source 42 is a switchable bias voltage source coupled between the second electrode 32 and, to ground, through a resistor 44, as shown. The switchable voltage source 42 can be either a positive, a negative or an ac voltage source. In this embodiment, the switchable or pulsed voltage source 42 switches between ground and a positive voltage at its output 43 to thereby produce a switchable electrostatic force between the first electrode 30 and the second electrode 32 to electrostatically drive the switch 10 (i.e., the switchable capacitor 26) between the activated state (when source 42 produces a positive potential at output 43 relative to ground) as shown in FIG. 2D and the de-activated state shown in FIG. 2C (i.e., when the voltage source 42 produces the ground voltage at output 43). (Note that dc blocking capacitors, not shown, in series with the input section 19 and/or output section 20, are used and provided in accordance with standard practice to isolate the pulsed voltage supply 42 from the transmission lines.

Figure 2C:
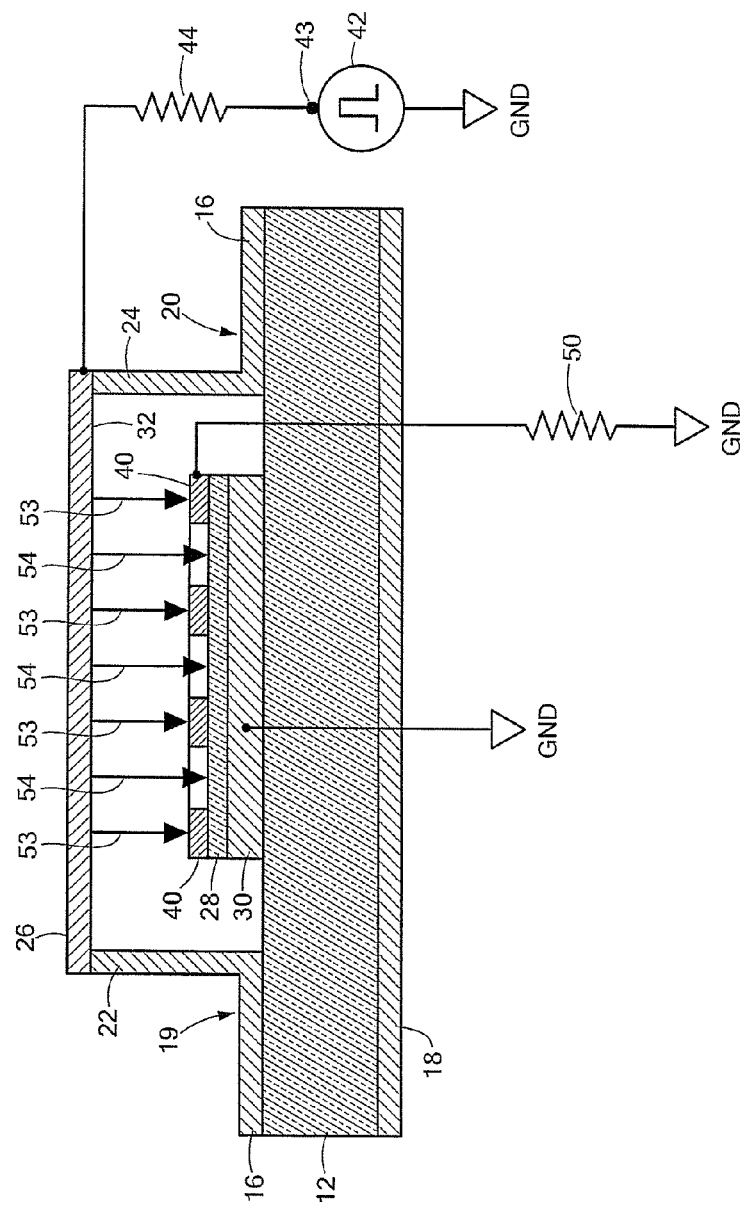
FIG. 2C is a schematic diagram of the switching system of FIG. 1 is the open or de-activated state.
Figure 2D:
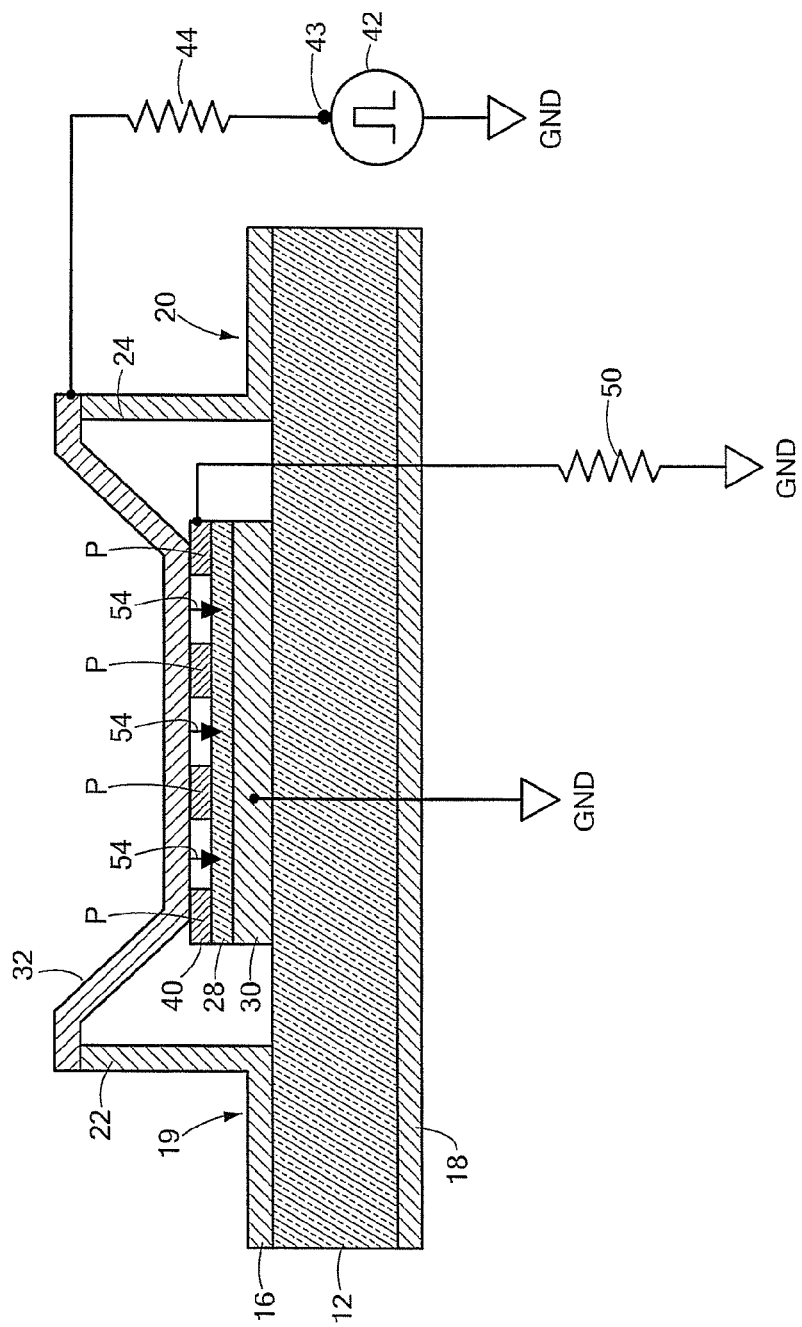
FIG. 2D is a schematic diagram of the switching system of FIG. 1 in the closed or activated state.

When the switchable capacitor 26 is the de-activated state, (i.e., the second electrode 32 is separated from the top plate 40 as shown in FIG. 2B or 2C), microwave energy on the input section 19 is coupled to the output section 20 through the switch 10. On the others hand, when the switchable capacitor 26 is the activated state as shown in FIG. 2D, microwave energy on the input section 19 is de-coupled from the output section 20 and passes to ground through the grounded first electrode 30. When the switchable capacitor is electrostatically driven to an activated state, the second, flexible one of the electrodes contacts the top plate, and when the switchable capacitor is returned to the de-activated state, charge on the top plate 40 is discharged from the top plate 40 to the reference potential.

More particularly, the top plate 40 disposed on the dielectric 28 is connected through the high value resistor 50 to a reference potential, here ground potential. The resistance of the resistor 50 connected to the top plate 40 is high enough to prevent significant RF or dc currents to flow between the second, flexible electrode 32 and the top plate 40 to the reference potential, here ground. This high value resistance of resistor 50, e.g., a meg-ohm, for example, assures that there will be no arcing currents between the top plate 40 and the second, flexible electrode 32 to potentially fuse the top plate 40 to the second, flexible electrode 32 when the switch is actuated. The top plate 40 on the dielectric 28 may be either a good conductor, such as gold or aluminum, or a resistive material such as, for example, Titanium Oxynitride. The use of a resistive material for the top plate 40 will further reduce the probability of a failure due to electrical arcing when the second flexible electrode 32 is brought in contact with the top plate 40.

Referring now to FIG. 2C, when top electrode 32 initially receives a sufficiently positive voltage (i.e., voltage from source 42 goes positive relative to ground), an electrostatic field 53 sets up between electrode 32 and the top plate 40 except where the apertures 41 exist (i.e., the non-apertured portions of top plate). Where the apertures 41 exist, electrostatic fields 54 set up between the pair of electrodes 30, 32. The electrostatic fields 54 have greater magnitude than the electrostatic fields 53 and both the electrostatic fields force the electrode 32 downwards towards the electrode 30 until the top flexible membrane makes contact with the non-apertured portions) of the top plate 40.

After this initial actuation, the voltage produced by source 42 is still high. It is noted that no electrostatic field 53 (FIG. 2C) exist between electrode 32 and the non-apertured or contact portion 57 of the top plate 40 once they make contact; however, the electrostatic field 54 remain between the pair of electrodes 30, 32, it being noted that the electrostatic fields 54 have also greatly increased in magnitude because the distance between pair of electrodes 30, 32 has reduced. These electrostatic fields 54 are responsible for keeping the switching structure 26 in an actuated state. No contact is made between the pair of electrodes 30, 32 thereby limiting charge transfer. At this point, the non-apertured portion of the top plate 40 and electrode 32 are equal potential. All voltage is dropped across the large resistors 50 and 44 to thereby maintain the charge on electrode 32 and thereby maintain the fields 54.

When the voltage source 42 is switched to produce ground at its output 43, the electric field 54 (FIG. 2D) is removed. Any residual charge left in the dielectric 28 is minimized due to minimizing the area where the charging field 44 existed by using the top plate 40. Without a sufficient electrostatic force, the electrode 32 restores to its previous upward position, as shown in FIG. 2C. The top plate 40 being coupled to ground through resistor 50 also prevents any change to the actuation voltage by terminating any residual charge field lines in the dielectric at the top plate 40 thus the voltage of the top plate 40 is unaffected by trapped charges and more importantly, the field 53 and electrostatic force between the top plate 40 and the flexible electrodes 32 are not affected by the trapped charge in the dielectric 28 under the top plate 40.

Referring again to FIG. 2D, it is noted that when the switch is in the activated condition, current passes from the source 43, through resistor 44 through flexible electrode 32, through the top plate 40, through resistor 50 and back to ground. The voltage between the top plate 40 and ground is equal to the voltage at output 43 times the ratio, R, of the value of the resistance of resistor 50 to the sum of the values of the resistance of resistor 50 and the value of the resistance of resistor 43. As long as the second, flexible electrode 32 is up and not in contact with the top plate 40 on top of the dielectric 28, the full potential exists across the air gap between the second, flexible electrode 32 and the dielectric 28, as well as across the air gap between the second, flexible electrode 32 and the top plate 40 thereby, exerting maximum force to close the switch 10.

More particularly, when the switch 10 is closed, i.e., the second, flexible electrode 32 is in contact with the top plate 40 at point P (FIG. 2D) on top of the dielectric 28, the voltage drop across the dielectric 28 is proportional to the ratio, R of the magnitude of the shunt resistor 50 to the total of the resistance in the bias circuit including the shunt resistor, i.e., the sum of the resistance of resistor 44 and the resistance of resistor 50. Thus, the dc circuits provide a voltage divider and the lower the shunt resistance of resistor 50, the lower the applied voltage across the dielectric 28. For example, if the magnitude of the shunt resistance 50 is equal to the magnitude of the resistance 44 in the second, flexible electrode bias circuit 60, the voltage across the dielectric will be reduced in half while the full voltage of source 42 would still be available to close the switch 10. It is necessary that the resulting voltage across the dielectric be sufficient to hold down the second, flexible electrode 32 as long as the second, flexible electrode bias 60 is applied. Although switch failure due to stiction resulting from stored charges in the dielectric 28 has been eliminated with this disclosure, reducing the voltage across the dielectric 28 provides an additional advantage of increasing the mean time to failure caused by dielectric breakdown.

The discharge path from the top plate 40 to ground through the large resistor 50 removes charge on the top plate 40 when the flexible electrode 32 returns to the up position (i.e, when the pulse is removed). This is important because we want the top plate 40 to be discharged to the ground potential before the next "on" pulse. Otherwise, the electrostatic field 53 between electrode 32 and the top plate 40 is reduced in the air gap above the top plate 40. This electric field is proportional to the difference between the top plate 40 potential and the flexible electrode 32 potential. It is desirable that this voltage (i.e., potential) difference be maximum at the start of activation since the separation between these two electrodes 40, 32 is maximum which reduces the electric field; i.e., the electric field is this potential difference divided by the air gap spacing.

It is also noted that the discharge path from the top plate 40 to ground through the large resistor 50 also removes charge in the solid dielectric 28 when the flexible electrode 32 returns to the up position or de-activated condition (i.e., when the pulse is removed). However, the charge under the top plate 40 is not very important since it is electrostatically shielded (screened) by the top plate 40. This charge in the dielectric 28 is offset by charge on the dielectric contacting side of the top plate 40, and no net electric field will extend in the air gap above the top plate 40 due to charge in the dielectric 28 under top plate 40. The electric field in the air gap above the top plate 40 is always determined by the difference in potential between the flexible electrode 32 and the top plate 40. What is important is that the charge on the dielectric 28 under the apertures 41 in the top plate 40 does impact the air gap field and therefore the force on the flexible electrode 32; i.e., there is no or minimal electrostatic shielding by top plate 40 in these air gap areas. The discharge path between the top plate 40 and ground through the resistor 50 will tend to discharge this charge which is important for the case where the solid dielectric in the apertures is not removed. One can view the top plate 40 apertures 41 as a collection point for charges as they slowly move across the dielectric 28 surface and through the bulk of the dielectric 28.

The ratio, R, of the value of the resistance of resistor 50 to the sum of the values of the resistance of resistor 50 and the value of the resistance of resistor 43 will depend on the other parameters of the system. More particularly, if one wants a very low voltage across the dielectric 28, the ratio R should be low or between 0.7 and 0.3. The "Resistance" times Capacitance (RC) time constant of the switch 10, (where "Resistance" is value of the resistance of resistor 43) which determines how fast the pulse signal appears at the flexible electrode 32 might determine how large the resistor 43 connected the flexible electrode 32 is. Typically, this resistance of resistor 43 should be small enough to satisfy the charging time constant but large enough that the pulse supply does not cause a large current spike in the system. Similarly the resistor 50 connected to the top plate 40 will determine how fast the top plate 40 discharges equal to its RC time constant. Remember, the top plate 40 should be discharged before the next "on" pulse. On the other hand, the resistor 43 cannot be too small or the voltage of the flexible electrode 32 after contact with top plate 40 will not be sufficiently large to hold the membrane electrode 32 "down". For different system applications, the optimization of these resistor values may be different.

From the standpoint of the RF/microwave signal fed to the input section 19, the capacitance provided by the dielectric 28 when the switch 10 is in the activated state (FIG. 2D) will effectively short out the high value shunt resistance 50 when the switch 10 is closed, making the resistor's 50 impact on the microwave performance minimal. The shunt resistance 50 will increase power dissipation from the second, flexible electrode 32 bias supply 42 when the switch 10 is closed which is not desired but under some circumstances may be worthwhile if the switch lifetime can be improved.

To put it still another way, when the flexible electrode 32 is in the down position it charges the top plate 40 to a voltage dependent on the ratio, R. of the value of the resistance of resistor 50 to the sum of the values of the resistance of resistor 50 and the value of the resistance of resistor 43. This charges the dielectric 28 under the electrode 4; however, charges under the top plate 40 are electrostatically shielded by top plate 40 and therefore do not impact the electric field between electrode 40 and the flexible electrode 32 and thereby do not affect the force on the flexible membrane electrode 32. In the down position, the flexible electrode 32 also charges the dielectric 28 under the apertures 41 (FIG. 2B) in the top plate 40. When the voltage source 42 is reduced to ground in order to release the flexible electrode 32, the resistor 50, discharges charge on the top plate 40 to ground through resistor 54 when the flexible electrode 32 is in the up position. However, charges which reside on portions of the dielectric 28 not covered by the top plate 40, i.e., the portions of the dielectric 28 exposed by the apertures 41 are not immediately discharged and can remain for a long time. It is these charges which can make the flexible electrode 32 stay down or stick to the top plate 40 after the voltage source 42 is reduced to ground or prevent flexible electrode 32 from coming down when voltage source 42 is increased from ground to a positive value. The top plate 40, which is grounded through resistor 50, provides an eventual path for these dielectric charges to discharge them to ground making the charging problem significantly less than for the standard RF MEMS which has no grounded top plate 40 and therefore no convenient way to remove these charges which can reduce the operational lifetime of the standard RF MEMS. In addition, if the top plate is sufficiently thick such that the flexible electrode 32 does not physically contact the dielectric 28 through the aperture 41, the stored charges in the dielectric under the apertures 41 will be minimal.

Figure 3:
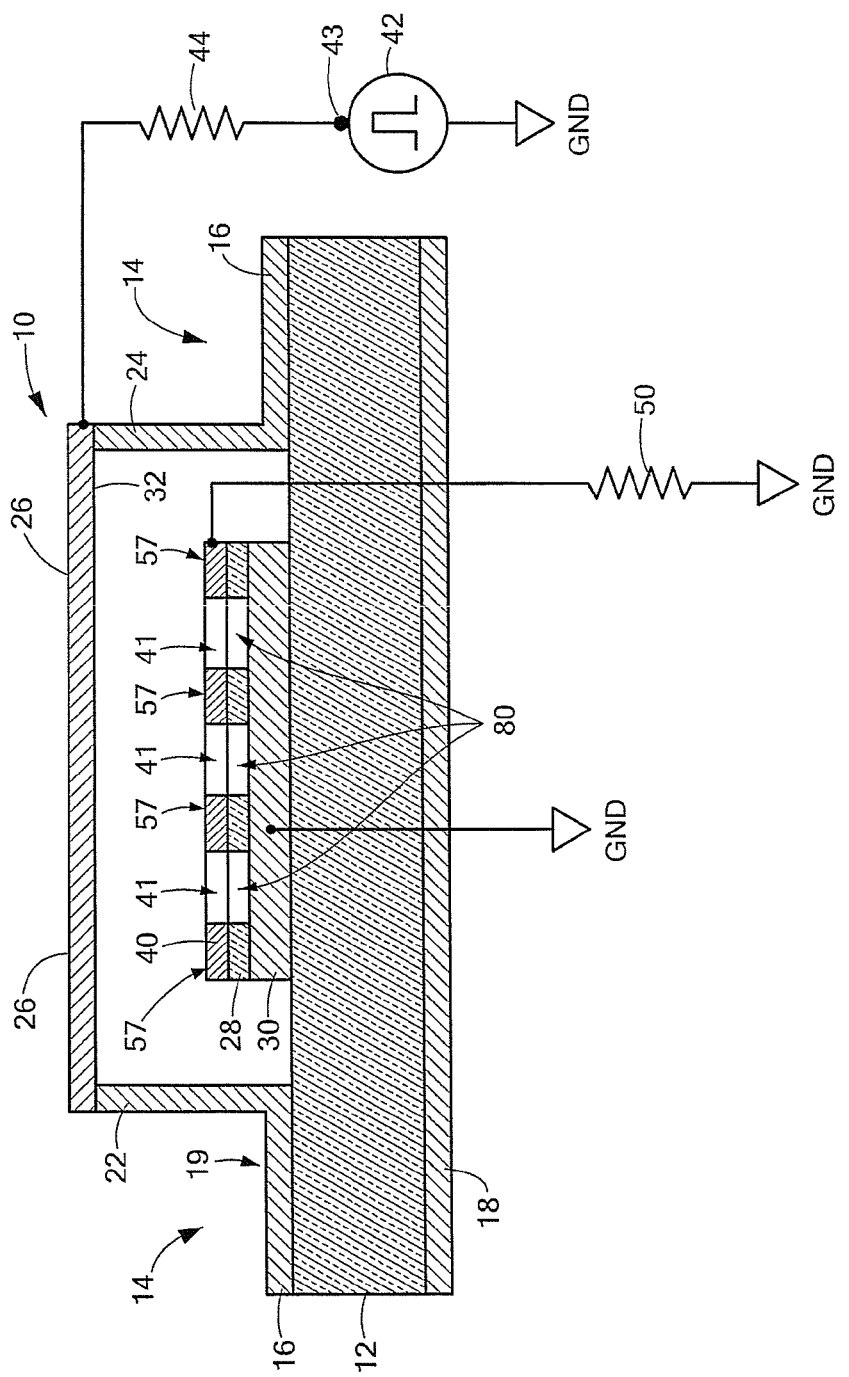
FIG. 3 is a cross-sectional diagrammatical sketch of a the switching system of FIG. 1, a switching system according to an alternative embodiment of the disclosure, such switching system being in a de-activated condition.
Figure 3A:
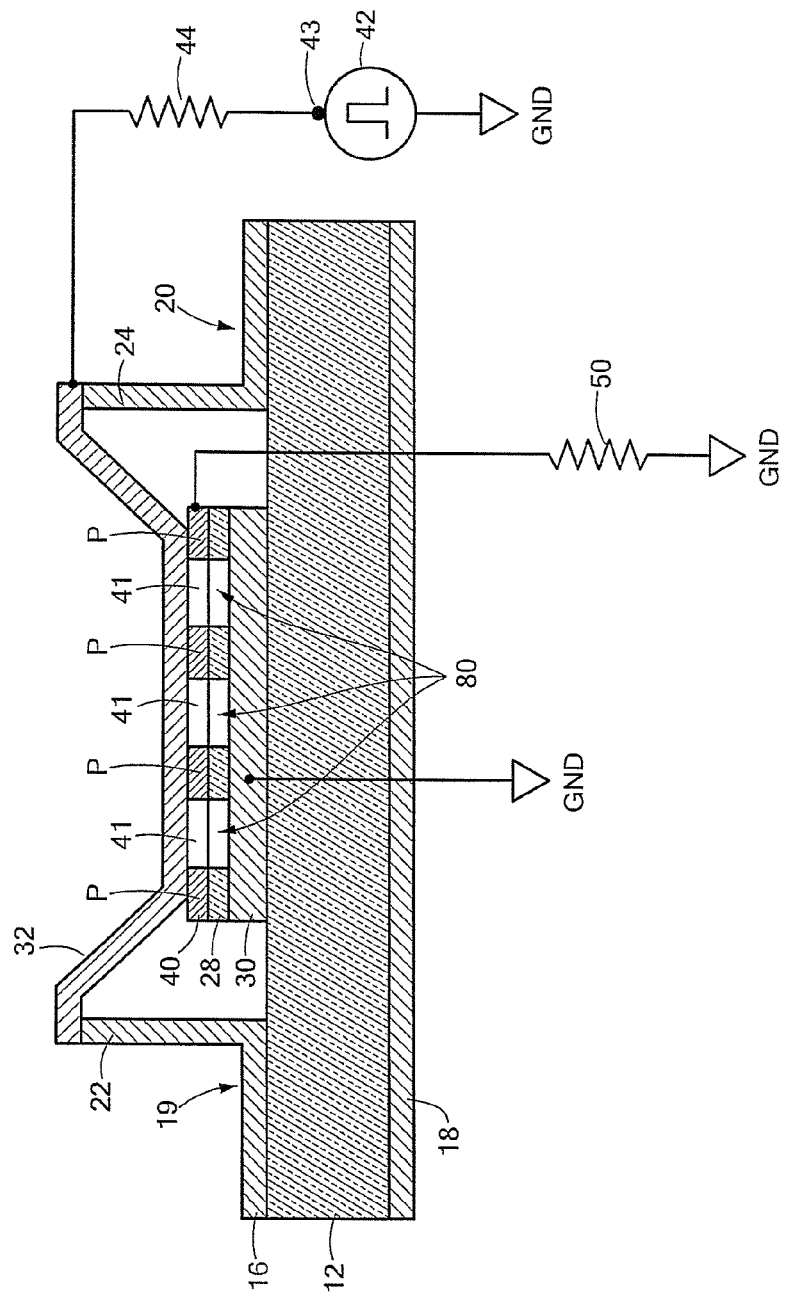
FIG. 3A is a cross-sectional diagrammatical sketch of the switching system of a FIG. 3 in an activated condition.

Referring now to FIGS. 3 and 3A, here the dielectric 28 is provided with apertures 80 under, i.e., in registration with, the apertures 41 in the top plate 40. By removing the portions of the dielectric 28 under the apertures 41 in the top plate 40, the resulting air gap cannot store any charges when the flexible electrode 32 is released from the down position and hence there will be no residual charges to either hold the flexible electrode 32 when it is down or prevent it from subsequently closing. This will completely eliminate dielectric 28 charging from impacting RF MEMS operation.

Figure 3B:
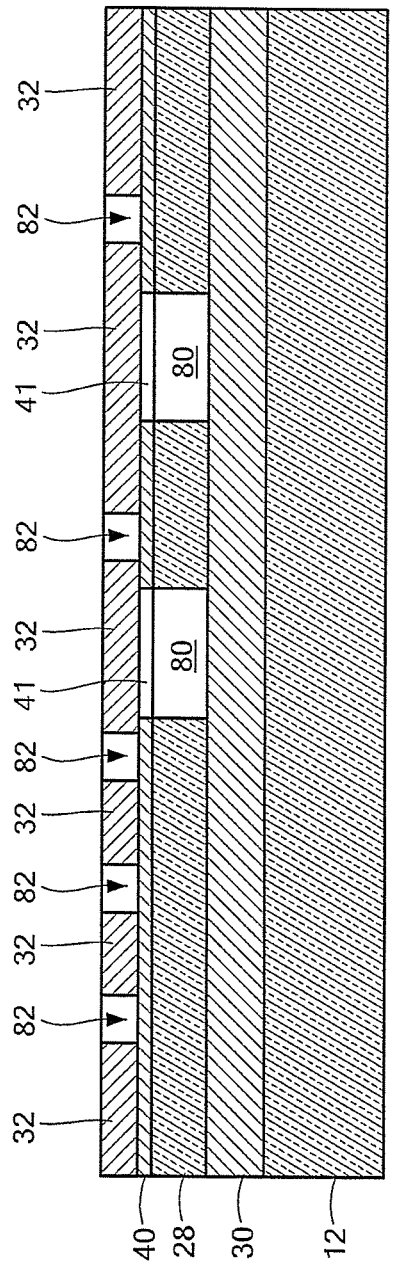
FIG. 3B is an enlarged, more detailed cross-sectional diagrammatical sketch of the switching system FIG. 3A with the switch in the activated condition shown in FIG. 3A.

It should be understood that, as shown in FIG. 1, there are holes 78 in the flexible electrode 32. Thus, it should be noted that the apertures 41 in the top plate 40 should be offset from the apertures 78 in the flexible electrode 32 and from apertures 41 in the top plate 40. Thus is shown more clearly in FIG. 3B which shows the switch of FIG. 3 in the closed or activated position shown in FIG. 3B.

Figure 4:
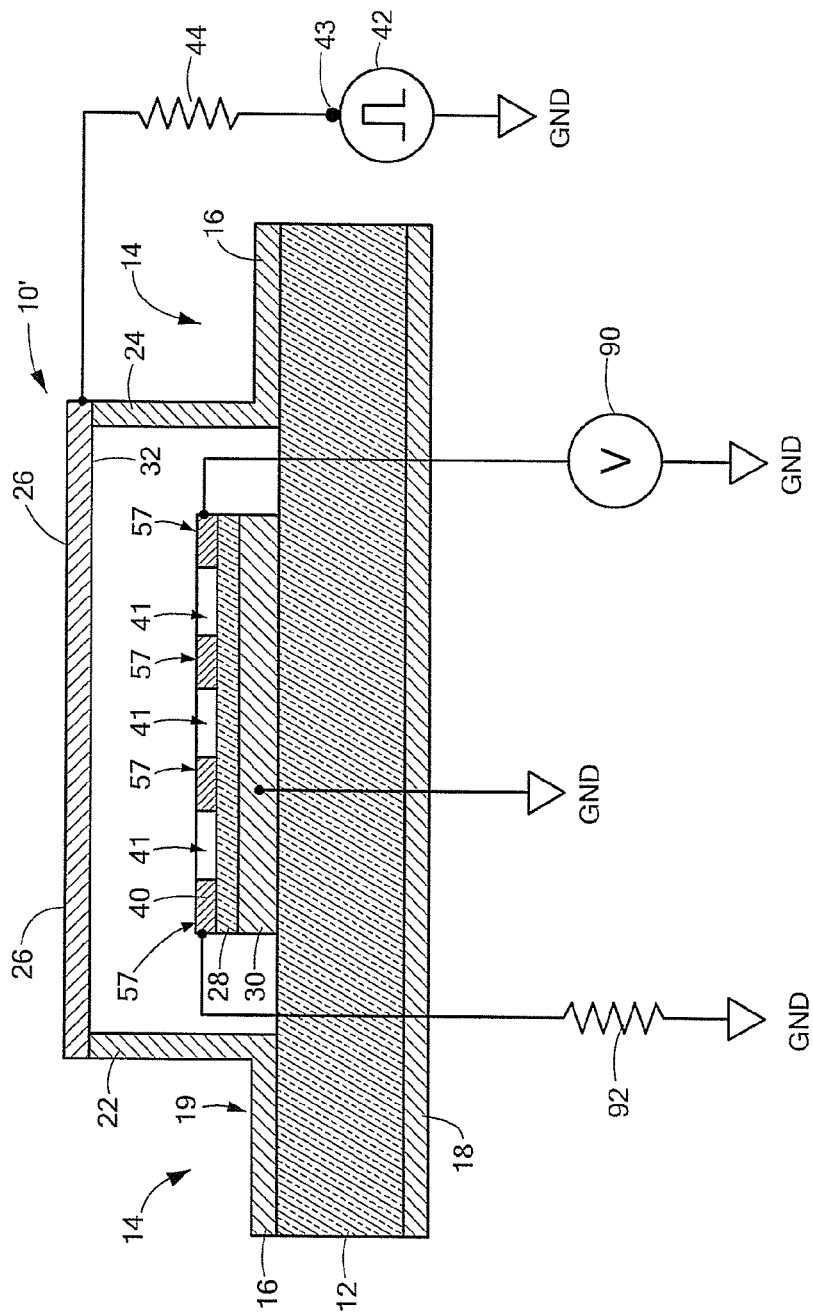
FIG. 4 is a cross-sectional diagrammatical sketch of the switching system of according to another embodiment of the disclosure.

Referring now to FIG. 4, a switching system 10 is shown. Here, the top plate 40 is resistive and a circuit is provided for heating this resistive top plate 40. The circuit includes: a voltage source 90 coupled between ground and resistor 50; as noted above, resistor 50 is connected to the top plate 40; here at one end of the top plate 40; and, a resistor 92 connected to the opposite end of the top plate 40 and then to ground, as shown. Here, with the top plate 40 on the dielectric 29 made from a resistive material, it can be used to slightly heat the first electrode 30 thereby causing moisture trapped in a package (not shown) for the switch 10 to migrate to cooler parts of the package which will further reduce stiction caused by moisture of the second, flexible electrode 32 to the top plate 40. For this case, the additional resistor 92 provides a radio frequency (rf) isolated current path for the heating current which would be provided by the voltage source 90. Heating of the underlying dielectric 28 by the top plate 40 will also tend to increase the rate in which the dielectric 28 can discharge through the shunt resistor 50, thereby reducing second, flexible electrode 32 stiction. Heating of the dielectric 28 by the top plate 40 will also increase the rate in which the dielectric charge under the aperture 41 areas in the top plate 40 can migrate in the dielectric 28 and discharge through the shunt resistor 50 and thereby further reduce stiction of the flexible electrode 32.

The use of a resistive top plate 40 could be used to raise the temperature of the second, flexible electrode 32, when it is in contact with the top plate 40 i.e., in the down or activated position, in order to lower the second, flexible electrode's 32 pull-down voltage. For such an application, the pull-down voltage (i.e., the activation voltage provided by supply 42) would be intentionally designed to be higher than in FIG. 2A and heating the resistive top plate 40 would be used to lower the pull-down voltage to the desired value, thereby compensating for variations in the pull-down voltage due to process variations. This approach could be used to compensate for the natural reduction in pull-down voltage as the switch heats up due to environmental or RF power dissipation assuming that the temperature of the RF MEMS circuit could be independently determined. For this application, the power supplied by supply to the resistive top plate 40 would be reduced as the package temperature increases, thereby maintaining a constant second, flexible electrode 32 temperature and pull-down voltage. It should be pointed out that the advantages cited for the heated resistive top plate 40 could also be obtained by simply using a resistive material adjacent to the MEMS switch 10 as a heater, however, it is expected that the time delay would be greater between when the heat was changed and when the second, flexible electrode 32 responded.

A number of embodiments of the disclosure have been described. Nevertheless, it will be understood that various modifications may be made without departing from the spirit and scope of the disclosure. Accordingly, other embodiments are within the scope of the following claims.

What is claimed is:

1. A switchable capacitor, comprising: a solid dielectric; a pair of electrodes, a first one of the electrodes having the solid dielectric thereon and a second, flexible one of the electrodes being suspended over the solid dielectric when the switchable capacitor is in a de-activated state; a top plate disposed between the solid dielectric and the second, flexible electrode and connected to a reference potential; the top plate having a plurality of apertures therein, and wherein when the switchable capacitor is electrostatically driven to an activated state, the second, flexible one of the electrodes contacts the top plate, and when the switchable capacitor is returned to the de-activated state, charge on the top plate is discharged to the reference potential.

2. A switch, comprising: a solid dielectric; a pair of electrodes, a first one of the electrodes having the solid dielectric thereon and a second, flexible one of the electrodes being suspended over the dielectric when the switchable capacitor is in an de-activate state; a top plate disposed between the solid dielectric and the second, flexible electrode and connected to a reference potential, the top plate having a plurality of apertures therein; and a switchable voltage source coupled between the first electrode and the second electrode for producing a switchable electrostatic force between the first electrode and the second electrode to electrostatically drive the switch between an activated state and the de-activated state; and wherein when the switch is electrostatically driven to the activated state, the second one of the electrodes contacts the top plate and when the switch is returned to the de-activated state, charge on the top plate is discharged from the top plate to the reference potential.

3. A switching system, comprising: a substrate; a microwave transmission line having an input section and an output section; a switchable capacitor disposed on the substrate; such capacitor comprising: a dielectric; a pair of electrodes, a first one of the electrodes having the dielectric thereon and a second, flexible one of the electrodes being suspended over the dielectric when the switchable capacitor is in an de-activated state and wherein the second, flexible one of the electrodes is electrostatically driven toward the first electrode when the capacitor is switched to an activated state; and a top plate disposed between the dielectric and the second, flexible electrode and connected to a reference potential; the top plate having a plurality of apertures therein; a switchable voltage source coupled between the first electrode and the second electrode for producing a switchable electrostatic force between the first electrode and the second electrode to electrostatically drive the capacitor between the activated state and the de-activated state; wherein when the switchable capacitor is electrostatically driven to the activated state: microwave energy on the input section is coupled to the output section through the switchable capacitor; and the second one of the electrodes contacts the top plate; and wherein when the switchable capacitor is returned to the de-activated state, charge on the top plate is discharged to the reference potential.

4. The switchable capacitor recited in claim 1 wherein the second one of the electrodes has apertures therein.

5. The switchable capacitor recited in claim 4 wherein the second one of the electrodes has apertures therein and wherein the apertures in the second one of the electrodes are offset from the apertures in the top plate.

6. The switch recited in claim 2 wherein the top plate is resistive.

7. The switch recited in claim 6 wherein the second one of the electrodes has apertures therein, and wherein the apertures in the top plate are aligned with the apertures in the dielectric.

8. The switch recited in claim 7 wherein the apertures in the second one of the electrodes are offset from the apertures in the top plate.

9. The switch recited in claim 2 wherein the top plate is resistive and including a circuit for heating the top plate.

10. The switch recited in claim 9 wherein the circuit includes the top plate.

11. The switchable capacitor recited in claim 1 wherein the top plate is resistive.

12. The switchable capacitor recited in claim 11 wherein the circuit includes the top plate.

13. The switchable capacitor recited in claim 1 wherein the top plate is resistive and wherein the second one of the electrodes has apertures therein offset from the apertures in the top plate.

14. A switchable capacitor, comprising: a solid dielectric; a pair of electrodes, a first one of the electrodes having the solid dielectric thereon and a second, flexible one of the electrodes being suspended over the solid dielectric when the switchable capacitor is in an de-activated state; a resistive top plate disposed between the solid dielectric and the second one of the electrodes; the top plate having a plurality of apertures therein, and wherein the switchable capacitor is electrostatically driven to an activated state, the second, flexible one of the electrodes contacts the top plate, and when the switchable capacitor is returned to the de-activated state, charge on the top plate is discharged to the reference potential.

15. The switchable capacitor recited in claim 14 wherein the top plate has apertures therein.

16. The switchable capacitor recited in claim 15 including a circuit to heat the resistive top plate.

17. The switchable capacitor recited in claim 16 wherein the circuit includes the top plate.

18. The switchable capacitor recited in claim 2 wherein a voltage across the dielectric is reduced at a point in time when the second one of the electrodes contacts the top plate.

19. The switchable capacitor recited in claim 2 wherein the solid dielectric has apertures therein in; wherein the top plate has apertures therein aligned with the apertures in the solid dielectric.

20. The switchable capacitor recited in claim 18 wherein the second one of the electrodes has apertures therein offset from the apertures in the top plate.

* * * * *